US008127079B2

(12) United States Patent
Heil et al.

(10) Patent No.: US 8,127,079 B2
(45) Date of Patent: Feb. 28, 2012

(54) INTELLIGENT CACHE INJECTION

(75) Inventors: Timothy H. Heil, Rochester, MN (US); Russell D. Hoover, Rochester, MN (US); Charles L. Johnson, Rochester, MN (US); Steven P. Vanderwiel, Rosemount, MN (US)

(73) Assignee: International Business Machines Corporation, Armonk, NY (US)

( * ) Notice: Subject to any disclaimer, the term of this patent is extended or adjusted under 35 U.S.C. 154(b) by 554 days.

(21) Appl. No.: 12/355,000

(22) Filed: Jan. 16, 2009

(65) Prior Publication Data

US 2010/0185819 A1 Jul. 22, 2010

(51) Int. Cl.
*G06F 13/00* (2006.01)
*G06F 13/28* (2006.01)

(52) U.S. Cl. ............... 711/124; 711/133; 711/E12.069
(58) Field of Classification Search ................. 711/124, 711/133, E12.069
See application file for complete search history.

(56) References Cited

U.S. PATENT DOCUMENTS

2011/0055488 A1* 3/2011 Vishin .................... 711/133
* cited by examiner

*Primary Examiner* — Edward Dudek, Jr.
(74) *Attorney, Agent, or Firm* — Jim Boice

(57) ABSTRACT

A first cache simultaneously broadcasts, in a single message, a request for a cache line and a request to accept a future related evicted cache line to multiple other caches. Each of the multiple other caches evaluate their occupancy to derive an occupancy value that reflects their ability to accept the future related evicted cache line. In response to receiving a requested cache line, the first cache evicts the related evicted cache line to the cache with the highest occupancy value.

8 Claims, 6 Drawing Sheets

| $b_0$ | $b_1$ | MEANING |
|---|---|---|
| 0 | 0 | SET IS FULL OF 1ST CLASS LINES |
| 0 | 1 | SET CONTAINS AT LEAST ONE 2ND CLASS LINE & NO INVALID LINES |
| 1 | 0 | SET CONTAINS AT LEAST ONE INVALID LINE & NO 2ND CLASS LINES |
| 1 | 1 | SET CONTAINS BOTH INVALID AND 2ND CLASS LINES |

| $b_0$ | $b_1$ | $b_2$ | MEANING |
|---|---|---|---|
| 0 | 0 | 0 | SET CONTAINS ONLY 1ST CLASS LINES |
| 0 | 0 | 1 | SET CONTAINS ONE 2ND CLASS LINE |
| 0 | 1 | 0 | SET CONTAINS ONE INVALID LINE |
| 0 | 1 | 1 | SET CONTAINS >1 2ND CLASS LINE AND ONE INVALID LINE |
| 1 | 0 | 0 | SET CONTAINS >1 INVALID LINES AND ONE 2ND CLASS LINE |
| 1 | 0 | 1 | SET CONTAINS ONLY 2ND CLASS LINES |
| 1 | 1 | 0 | SET CONTAINS MULTIPLE 2ND CLASS AND INVALID LINES |
| 1 | 1 | 1 | SET CONTAINS ONLY INVALID LINES |

INTELLIGENT CACHE INJECTION

BACKGROUND OF THE INVENTION

1. Technical Field

The present disclosure relates to the field of computers, and specifically to memory storage. Still more particularly, the present disclosure relates to managing cache data.

2. Description of the Related Art

Cache memory (cache) is defined as a local high-speed memory, which is typically located within or near a core of a processor. Because the amount of room within a cache is limited, a cache/memory controller will only store in cache the instructions/data that are needed by the processor. Thus, caches often replace ("evict") less frequently used blocks of data (hereafter a "cache line" or just "line") to make room for more recently used data. In most systems the line is either written back to memory (if the evicted line has been modified) or simply replaced by the newer line (if the evicted line has not been modified). Either action is known as "evicting" the line. After the line has been evicted, it may be again needed by the processor and therefore must be brought back into the processor's cache from memory.

Similarly, caches may share cache lines among themselves. This process can be made mandatory, where one cache imposes ("injects") a cache line on another cache. However, the injection process is fraught with problems and issues, particularly in deciding which cache will be the candidate for injection of an evicted cache line.

SUMMARY OF THE INVENTION

A first cache simultaneously broadcasts, in a single message, a request for a cache line and a request to accept a future related evicted cache line to multiple other caches. Each of the multiple other caches evaluate their occupancy to derive an occupancy value that reflects their ability to accept the future related evicted cache line. In response to receiving a requested cache line, the first cache evicts the related evicted cache line to the cache with the highest occupancy value.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

FIG. 6 illustrates a two-bit scoring operand for computing an occupancy value of a receiver cache that is a candidate for receiving an evicted cache line from a first cache;

FIG. 7 illustrates a three-bit scoring operand for computing an occupancy value of a receiver cache that is a candidate for receiving an evicted cache line from a first cache.

DETAILED DESCRIPTION OF THE PREFERRED EMBODIMENT

In a multi-processor computer system in which each processor employs one or more caches, it can be advantageous to move an evicted line from one cache to another. For example, if the processor associated with one cache is much busier than another processor, it may make sense to allow the busy processor to evict lines from its cache into the less busy processor's cache. If the evicted line is later needed by the same or even a different processor, it can more quickly be retrieved from the remote cache than from Dynamic Random Access Memory (DRAM), also known as "memory" or "system memory." To distinguish between evicted lines that go to memory versus lines that pass to another cache, the latter case (pushing evicted lines to another cache) is referred to as "cache injection."

There are multiple caches in which the line could be injected. Ideally, the line is placed in a cache that would not be perturbed by the addition of the evicted line. To accomplish this goal, the present invention, as described in detail below, presents a non-random methodology that injects an evicted cache line into a receiver cache that has a highest calculated occupancy score, which indicates that this particular receiver cache would be the least-perturbed cache if so injected.

Figure 1:
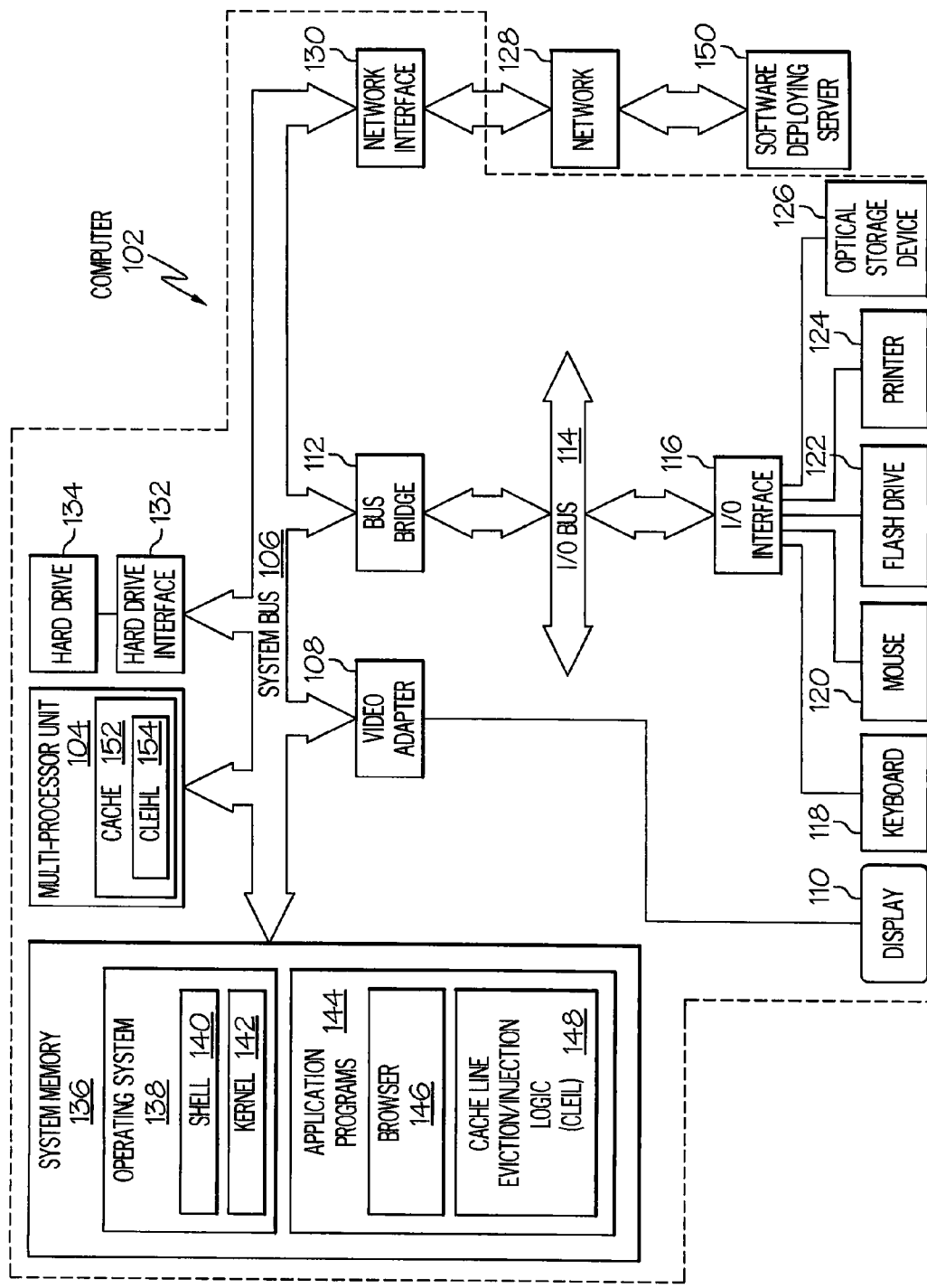
FIG. 1 depicts an exemplary computer which may be utilized by the present invention.

With reference now to the figures, and in particular to FIG. 1, there is depicted a block diagram of an exemplary computer 102, which the present invention may utilize. Note that some or all of the exemplary architecture shown for computer 102 may be utilized by software deploying server 150.

Computer 102 includes a multi-processor unit 104, which may utilize one or more processors each having one or more processor cores, that is coupled to a system bus 106. Within the multi-processor unit 104 are one or more levels (i.e., L1, L2, and/or L3) of cache 152. A video adapter 108, which drives/supports a display 110, is also coupled to system bus 106. System bus 106 is coupled via a bus bridge 112 to an Input/Output (I/O) bus 114. An I/O interface 116 is coupled to I/O bus 114. I/O interface 116 affords communication with various I/O devices, including a keyboard 118, a mouse 120, a Flash Drive 122, a printer 124, and an optical storage device 126 (e.g., a CD-ROM drive). The format of the ports connected to I/O interface 116 may be any known to those skilled in the art of computer architecture, including but not limited to Universal Serial Bus (USB) ports.

Computer 102 is able to communicate with a software deploying server 150 via network 128 using a network interface 130, which is coupled to system bus 106. Network 128 may be an external network such as the Internet, or an internal network such as an Ethernet or a Virtual Private Network (VPN).

A hard drive interface 132 is also coupled to system bus 106. Hard drive interface 132 interfaces with a hard drive 134. In a preferred embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a World Wide Web (WWW) client (i.e., computer 102) to send and receive network messages to the Internet using HyperText Transfer Protocol (HTTP) messaging, thus enabling communication with software deploying server 150 and other described computer systems.

Application programs 144 in computer 102's system memory (as well as software deploying server 150's system memory) also include a Cache Line Eviction/Injection Logic (CLEIL) 148. CLEIL 148 includes code for implementing the processes described below, and particularly as described in FIGS. 2-8. In one embodiment, computer 102 is able to download CLEIL 148 from software deploying server 150, including in an on-demand basis. Note further that, in one embodiment of the present invention, software deploying server 150 performs all of the functions associated with the present invention (including execution of CLEIL 148), thus freeing computer 102 from having to use its own internal computing resources to execute CLEIL 148. While the present invention can be implemented using software logic found in CLEIL 148 as described, in a preferred embodiment cache line eviction/injection is performed by a Cache Line Eviction/Injection Hardware Logic 154 found within cache 152.

The hardware elements depicted in computer 102 are not intended to be exhaustive, but rather are representative to highlight essential components required by the present invention. For instance, computer 102 may include alternate memory storage devices such as magnetic cassettes, Digital Versatile Disks (DVDs), Bernoulli cartridges, and the like. These and other variations are intended to be within the spirit and scope of the present invention.

Figure 2:
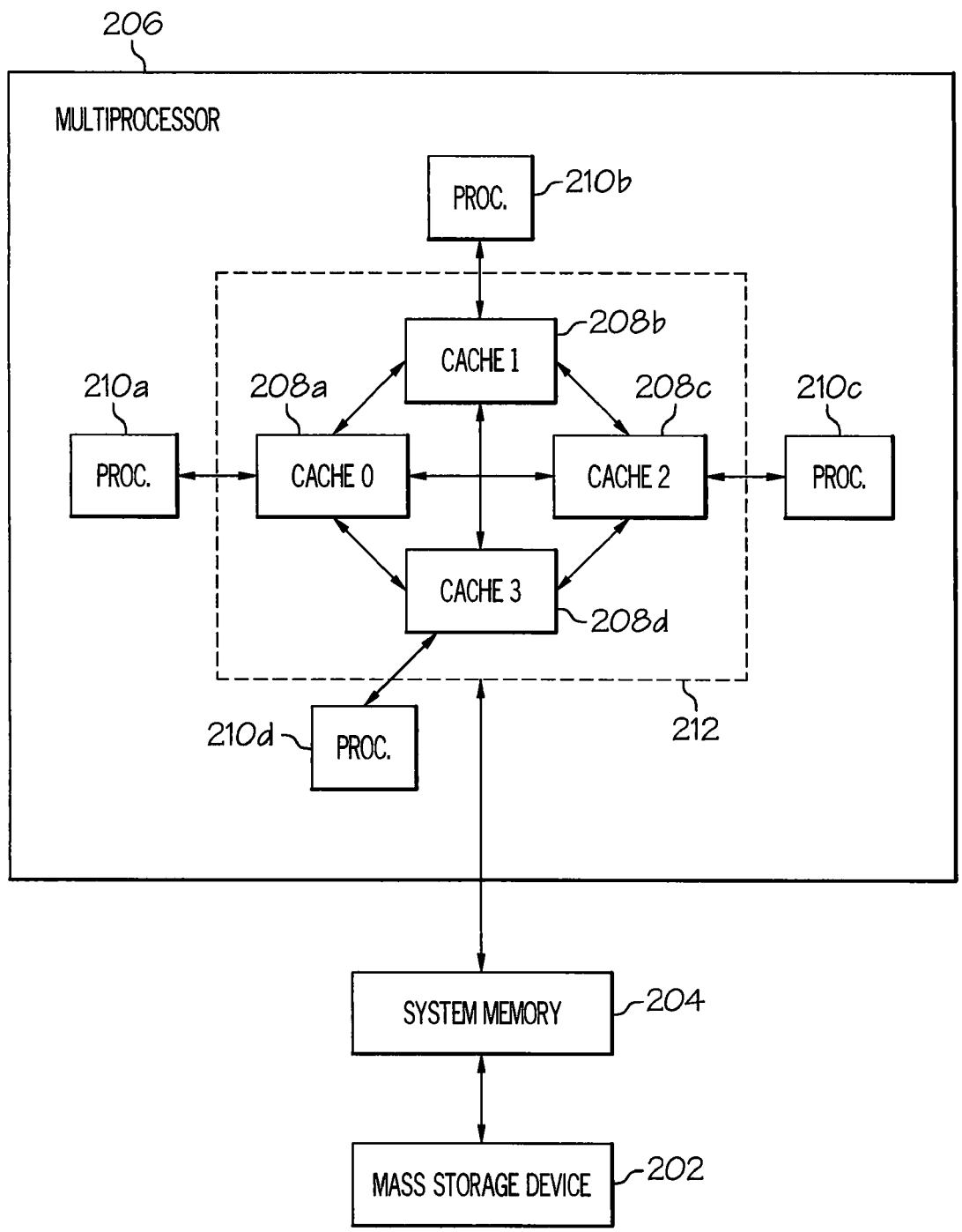
FIG. 2 illustrates additional detail of interactive caches for the multiprocessor shown in FIG. 1.

Referring now to FIG. 2, a description of cache interaction is presented. A mass storage device 202 is a lowest level of memory. Examples of mass storage device 202 include the hard drive 134 shown in FIG. 1 and tertiary storage devices (not shown) such as tape drives, off-site back-up services, etc. The next higher level of memory is system memory 204, such as the system memory 136 described in FIG. 1. The next higher level of memory is a multi-cache 212, which includes caches 208a-d. Each of the caches 208a-d are depicted in an exemplary manner in FIG. 1 as cache 152. Each of the caches 208a-d are associated (directly support and are directly read to and written from) with a particular processor from processors 210a-d, which make up the multiprocessor 206 (e.g., multi-processor unit 104 shown in FIG. 1). Note that each of the caches 208a-d are also able to communicate with one another in order to share/retrieve/inject cache lines among themselves.

Figure 3:
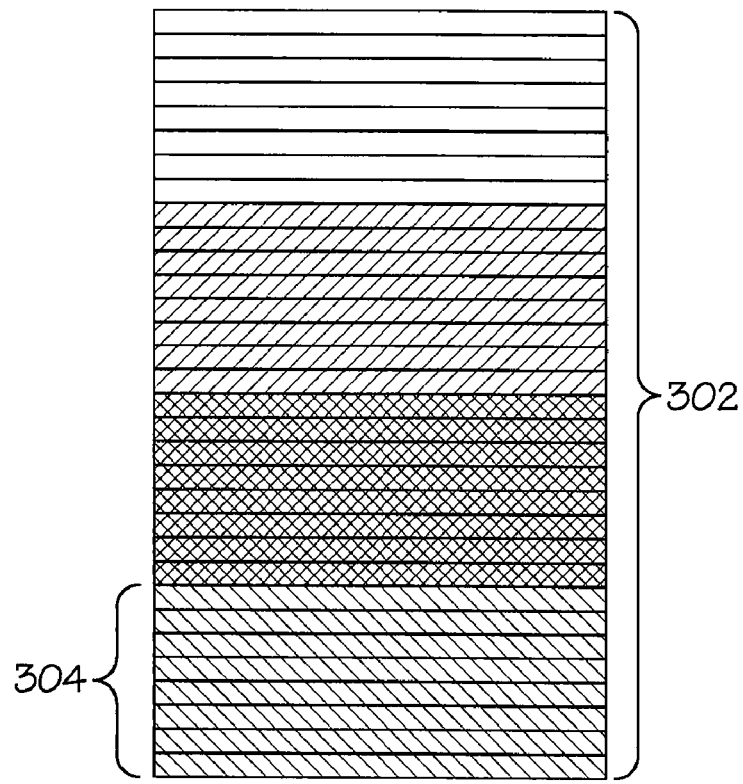
FIG. 3 depicts an exemplary storage of set associate cache lines in one of the interactive caches shown in FIG. 2.
Figure 4:
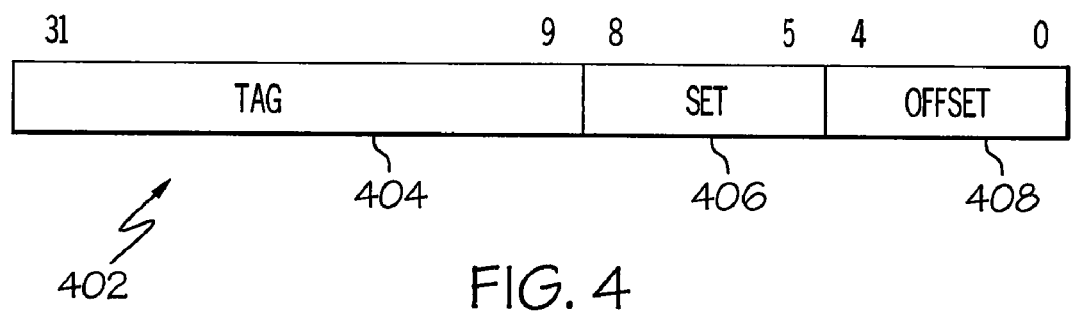
FIG. 4 illustrates an address of a cache line stored in a slot in the storage set depicted in FIG. 3.

With reference now to FIG. 3, an exemplary cache storage organization 302 is depicted as having four cache sets, including cache set 304. Cache set 304 has a same set index number. To understand the significance of having a same set index number with reference to a preferred embodiment of the present invention, consider the address schema shown in FIG. 4. An address line 402 includes a tag field 404, a set field 406, and an offset field 408. The tag field 404 identifies a section of system memory that is used by the entire cache storage organization 302. The set field 406 identifies a particular cache set (e.g., cache set 304) within the cache storage organization 302, and the offset identifies a particular cache line (e.g., one of the eight cache lines within cache set 304) in which a specific cache line is stored. The tag field 404 and set field 406 are set by the protocol of the present invention as being the same for the received injected cache line and the evicted cache line (the evicted cache line is the result of receiving the received injected cache line). Since the evicted and received injected cache lines come from a same associative cache set, it is therefore only the offset field that must be communicated between an evicting cache and a receiving cache.

Figure 5:
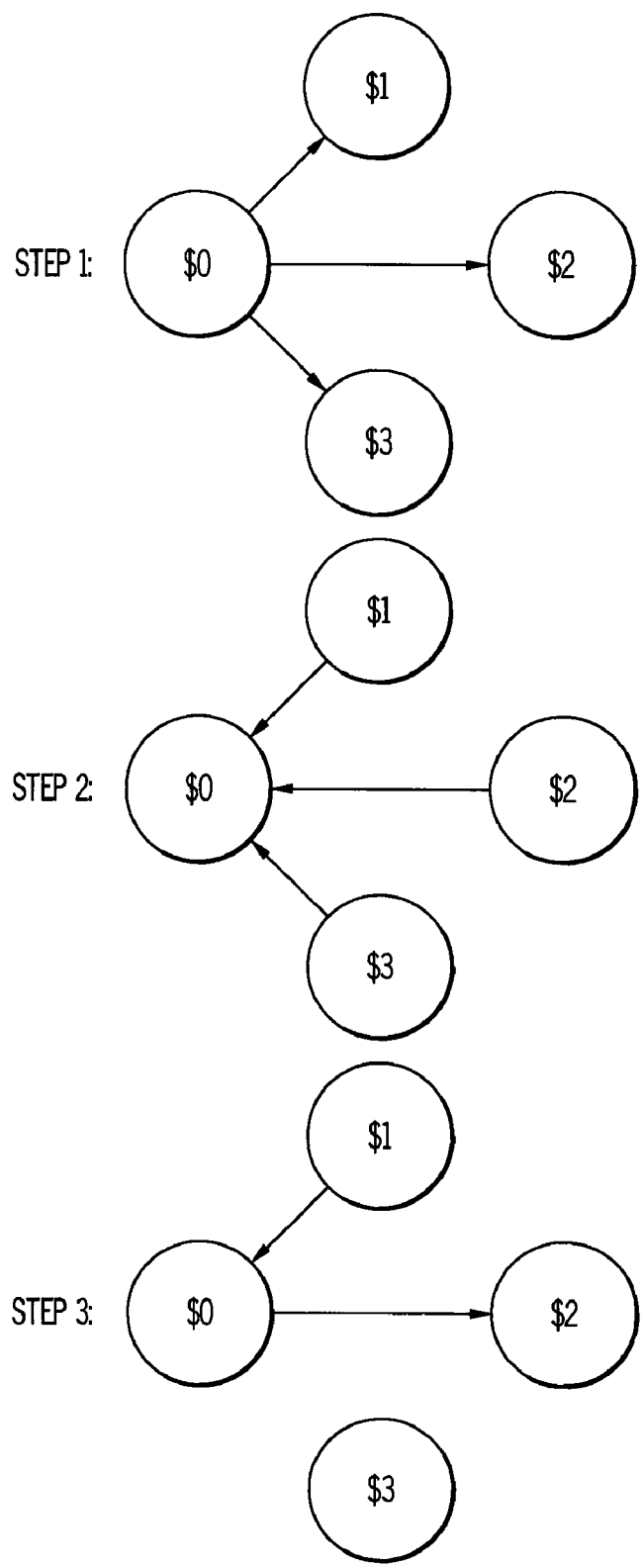
FIG. 5 depicts an intelligent cache eviction/injection sequence in accordance with an exemplary embodiment of the present invention.

Referring now to FIG. 5, a high level depiction of an interaction among caches (e.g., caches 208a-d shown above in FIG. 2) in accordance with the present invention is presented. In Step 1, cache zero ($0) simultaneously (in a single message) broadcasts a request for a cache line along with a request that another cache be willing to accept an evicted cache line that will result from cache zero receiving the requested cache line. That is, the first part of the broadcasted message asks cache one ($1), cache two ($2), and cache three ($3) if they have a specific cache line. The message asks cache one, cache two, and cache three to not only respond as to whether they have the requested cache line, but also to indicate how willing they are to accept a new line into the same set.

The second part of the broadcasted message tells cache one, cache two, and cache three that cache zero will be evicting a cache line as a result of receiving the requested cache line, and thus is asking if any of cache one, cache two, or cache three are good candidates for receiving the evicted cache line. The determination of which is the "best" candidate is based on the process described below, for generating an occupancy value, in which the candidate receiver caches evaluate what they have in their caches, particularly within a same cache set as the requested cache line. This evaluation and the resulting occupancy value help cache zero determine the best candidate for receiving the evicted cache line. Of course, if the requested cache line is in none of the other caches, then the requesting cache will look for the needed cache line in higher cache level (i.e., L1 can look in L2, L2 can look in L3, etc.) or system memory.

Exemplary occupancy values can be described in two or three bits, as shown in FIG. 6 and FIG. 7, for transmission to the requesting cache. For example, as shown in table 602 in FIG. 6, occupancy values can range from "00" as the lowest score and "11" as the highest score. As indicated, as score "00" indicates that only first class lines (cache lines that were placed into or modified in the local cache by a local processor) are in the candidate receiver cache set, and thus this would not be a good candidate for receiving an injected cache line. A score of "01" indicates that the candidate cache set has at least some second class lines (cache lines that were previously injected into the candidate cache by another cache), thus making this a better candidate for receiving an injected cache line than a cache that has a score of "00." A score of "10" indicates that the cache set also has at least one invalid cache line (contains data that has been changed in another cache, and thus the old data that is still stored in this cache line is invalid), thus making such a line readily available to be overwritten with the injected cache line from cache zero. Finally, a score of "11" indicates that the candidate cache set has both invalid and second class lines, making it an even better candidate for receiving the evicted cache line from cache zero.

The table 702 shown in FIG. 7 provides more detailed scoring for occupancy values, with "000" being the lowest (having only first class lines) and "111" being the highest (having only invalid lines) scores for a candidate receiver cache.

Note that the two or three bit score is transmitted to cache zero, which then ranks the candidate receiver caches according to their occupancy scores.

As shown in Step 2 of FIG. 5, cache one, cache two, and cache three all respond (either positively or negatively) to the request for the requested cache line. That is, cache one, cache two, and cache three indicate whether they have a valid copy of the requested cache line. At the same time (or alternatively in another message), cache one, cache two, and cache three transmit an occupancy score that describes whether they are a good candidate for receiving the evicted cache line that will result from cache zero receiving the requested cache line. Again, note that the receiving cache will inject the evicted cache line into a same cache set that contained the requested cache line, both in cache zero and in the receiver cache.

As shown in Step 3 of FIG. 5, cache one provided the requested cache line to cache zero, since it had the requested cache line. After receiving the requested cache line, cache zero stores the requested cache line, evicts another cache line from the cache set, and sends for storage (injects) the evicted cache line to cache two, which has the highest occupancy value compared to that calculated for cache one and cache three. Cache two may in turn evict a cache line from the cache set upon receipt of cache zero's evicted line, starting a cascade of evicted cache lines that are injected into appropriate caches or sent to system memory.

Again, note that the calculations of the occupancy values are performed by the cache hardware that is dedicated to and coupled to specific caches being scored.

Figure 8:
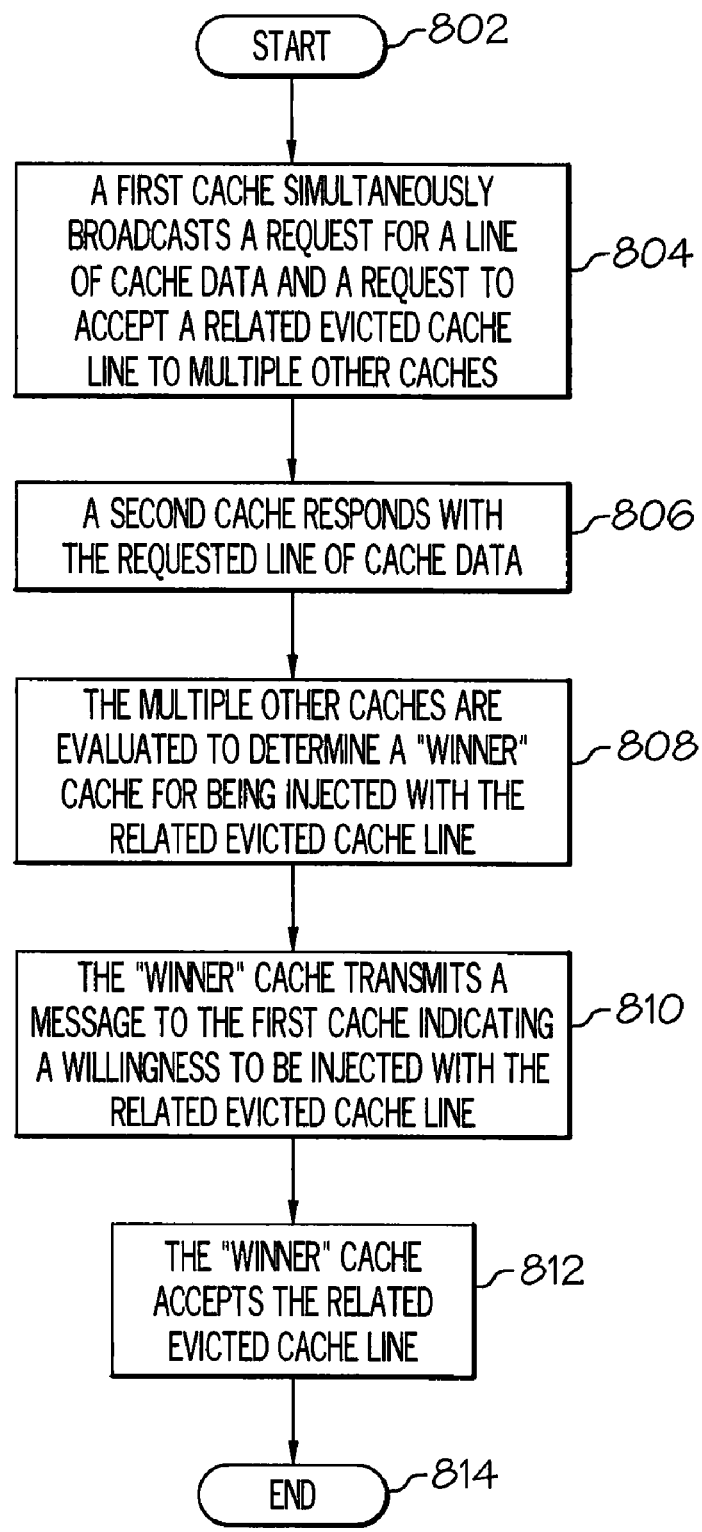
FIG. 8 is a high level flow chart of exemplary steps taken by the present invention to intelligently evict/inject cache lines in accordance with relative occupancy values of candidate receiver caches.

With reference now to FIG. 8, a high level flow chart of exemplary steps taken to intelligently inject cache lines is presented. After initiator block 802, a first cache transmits a message that contains two parts: a request for a line of cache data and a request for another cache to accept, in the future, an evicted line of cache data that resulted from storing the requested (and received) line of cache data (cache line), as described in block 804. As shown in block 806, a second cache responds with the requested cache line. As described above, this second cache is the cache that is in the best position to provide the requested cache line. Thus, the first cache may then select and instruct a specific cache to deliver the requested cache line.

Similarly, as described in block 808, the other caches quantify whether they are good candidates to receive injected cache lines, which result from the requested cache line being sent to and stored in the first cache. This quantification/qualification is represented by occupancy scores for each of the candidate caches, which are transmitted to the first cache (block 810). The first cache then selects the best cache to be the one that will receive the evicted cache line, and injects the evicted cache line into that best cache (block 812). The process ends at terminator block 814.

While the present invention describes caches as requesting, storing, transmitting and injecting cache lines, it is understood that such action may actually be performed by an associated logic, such as a processor that is coupled to and/or dedicated to the cache that is doing the requesting, storing, transmitting, injecting, etc. Similarly, a dedicated cache controller or dedicated memory controller coupled to and/or dedicated to the cache may also perform the necessary actions required. Furthermore, while the present invention has been described as cache lines being manipulated in the described manner, it is understood that smaller units of data (bits, bytes, words, etc.) can also be manipulated using the fundamental novel concepts described herein.

Thus, in the process described herein, when a cache sees a request, it will do a lookup in the appropriate associative set to see if it has the line. If it does, it responds positively. If not, it responds negatively. If the request included a hint (e.g., a high occupancy score) that a cache eviction from the requester will take place, the responding cache also reports the occupancy of its associative set. The occupancy score is reported back to the requester and compared to those of the other responders so that a "winner" can be chosen. In the examples described above, this decision is based on a simple priority comparison of the bits used to encode the occupancy. Ties can be resolved by random or round robin selection.

In calculating an occupancy value, one indicator for a best good injection destination is the number of invalid lines in a cache's affected associative set. The space occupied by an invalid line is not being used and thus is "free" space. The next best indicator is the number of "second class" lines in the cache. Second class status is a previously established technique used to give injected lines lower priority with regard to the cache's Least Recently Used (LRU) algorithm to prevent injected lines from overrunning the cache. This is accomplished by marking lines injected into a cache as "second class," meaning they are more likely to be evicted from a cache in favor of lines that have been requested by the associated processor. The present invention can use this information to help calculate an occupancy value by giving caches with more second class lines higher availability rating based on the assumption that these caches are less busy satisfying requests by the associated processor. As shown above in FIGS. 5-7, both the number of invalid lines and the number of second class lines can be used to calculate an occupancy value.

The present invention thus presents a process in which the decision to provide and/or receive a line of cache data is based on the destination cache's ability to accept the line without unduly perturbing its state. For example, if one cache is particularly active and another is relatively idle, the latter cache should be chosen to accept the evicted line. Note also that, in a preferred embodiment, the requested line and any evicted line are necessarily from the same cache associative set. As such, it is relatively easy to establish when a new request will cause an eviction. This additional information is included in the broadcast of the request. Note also that, since the upper order bits of the requested and evicted lines will be the same, the broadcast of two full addresses is avoided, thus making for a more compact command.

It should be understood that at least some aspects of the present invention may alternatively be implemented in a computer-readable medium that contains a program product. Programs defining functions of the present invention can be delivered to a data storage system or a computer system via a variety of tangible signal-bearing media, which include, without limitation, non-writable storage media (e.g., CD-ROM), writable storage media (e.g., hard disk drive, read/write CD ROM, optical media), as well as non-tangible communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

While the present invention has been particularly shown and described with reference to a preferred embodiment, it will be understood by those skilled in the art that various changes in form and detail may be made therein without departing from the spirit and scope of the invention. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data.

What is claimed is:

1. A method of intelligently injecting a cache line, the method comprising:
   simultaneously broadcasting, from a first cache to multiple other caches, a single message that includes a request for a cache line and a request for another cache to accept a future evicted cache line;
   deriving an occupancy value for each of the multiple other caches, wherein the occupancy value reflects an ability to accept the future evicted cache line, wherein the occupancy value is computed by an algorithm having operands that are based on how many second class lines are in a same cache associative set compared to first class lines, wherein second class lines contain cache entries have been previously injected from another cache, wherein first class lines have been stored directly from a coupled processor that utilizes a directly coupled cache, and wherein first class lines lower the occupancy value and second class lines raise the occupancy value; and
   evicting and transmitting an evicted cache line to a receiver cache from the multiple other caches, wherein the receiver cache has a highest occupancy value compared to other caches from the multiple other caches.

2. The method of claim 1, wherein the evicting and transmitting of the evicted cache line is performed in response to the first cache receiving a requested cache line from a provider cache from the multiple other caches.

3. A system comprising:
   a plurality of processors;
   a first cache directly coupled to and dedicated to use by a first processor from the plurality of processors; and
   multiple other caches, wherein a different cache from the multiple other caches is coupled to and dedicated to each of other processors from the plurality of processors, wherein the first processor:
      simultaneously broadcasts, to multiple other caches that are coupled to and dedicated to the other processors, a request for a cache line and a request for one of the multiple other caches to accept a future evicted cache line;
      derives an occupancy value for each of the multiple other caches, wherein the occupancy value reflects an ability to accept the future evicted cache line, wherein the occupancy value is computed by an algorithm having operands that are based on how many second class lines are in a same cache associative set compared to first class lines, wherein second class lines contain cache entries have been previously injected from another cache, wherein first class lines have been stored directly from a coupled processor that utilizes a directly coupled cache, and wherein first class lines lower the occupancy value and second class lines raise the occupancy value; and
      in response to the first cache receiving a requested cache line from a provider cache from the multiple other caches, evicts and transmits an evicted cache line to a receiver cache from the multiple other caches, wherein the receiver cache has a highest occupancy value compared to other caches from the multiple other caches.

4. The system of claim 3, wherein the first cache and each of the multiple other caches are each associated with different dedicated processors that each respectively utilize only one of the first cache and the other multiple other caches.

5. The system of claim 4, wherein the provider cache and the receiver cache are a same cache.

6. A computer-readable storage medium on which is encoded a computer program, the computer program comprising computer executable instructions configured for:
   simultaneously broadcasting, from a first cache to multiple other caches, a request for a cache line and a request for another cache to accept a future evicted cache line;
   deriving an occupancy value for each of the multiple other caches, wherein the occupancy value reflects an ability to accept the future evicted cache line, wherein the occupancy value is computed by an algorithm having operands that are based on how many second class lines are in a same cache associative set compared to first class lines, wherein second class lines contain cache entries have been previously injected from another cache, wherein first class lines have been stored from a coupled processor that directly utilizes a directly coupled cache, and wherein first class lines lower the occupancy value and second class lines raise the occupancy value; and
   in response to the first cache receiving a requested cache line from a provider cache from the multiple other caches, evicting and transmitting an evicted cache line to a receiver cache from the multiple other caches, wherein the receiver cache has a highest occupancy value compared to other caches from the multiple other caches.

7. The computer-readable storage medium of claim 6, wherein the first cache and each of the multiple other caches are each associated with different dedicated processors that each respectively utilize only one of the first cache and the other multiple other caches.

8. The computer-readable storage medium of claim 6, wherein the provider cache and the receiver cache are a same cache.

* * * * *